United States Patent [19]
Takikawa et al.

[11] Patent Number: 5,970,200
[45] Date of Patent: Oct. 19, 1999

[54] APPARATUS HAVING OPTICAL COMPONENTS AND A MANUFACTURING METHOD THEREOF

[75] Inventors: Osamu Takikawa, Kamakura; Hideto Furuyama, Yokohama, both of Japan

[73] Assignee: Kabushiki Kaisha Toshiba, Kawasaki, Japan

[21] Appl. No.: 09/040,342

[22] Filed: Mar. 18, 1998

[30] Foreign Application Priority Data

Mar. 21, 1997 [JP] Japan ................................. 9-067881
Jul. 29, 1997 [JP] Japan ................................. 9-202997

[51] Int. Cl.$^6$ ...................................................... G02B 6/00
[52] U.S. Cl. ............................................................ 385/137
[58] Field of Search ............................................. 385/137

[56] References Cited

U.S. PATENT DOCUMENTS

| | | | |
|---|---|---|---|
| 4,802,727 | 2/1989 | Stanley et al. | 385/89 |
| 5,327,517 | 7/1994 | Yamada et al. | 385/137 |
| 5,425,118 | 6/1995 | Sugihara et al. | 385/59 |
| 5,522,000 | 5/1996 | Ayliffe et al. | 385/88 |
| 5,778,120 | 7/1998 | Asakura et al. | 385/49 |
| 5,859,943 | 1/1999 | Asakura et al. | 385/49 |

FOREIGN PATENT DOCUMENTS 7-249798   9/1995   Japan .

*Primary Examiner*—Akm E. Ullah
*Attorney, Agent, or Firm*—Oblon, Spivak, McClelland, Maier & Neustadt, P.C.

[57] ABSTRACT

An apparatus having optical components comprising a mounting substrate, an optical fiber held on the mounting substrate, an optical element fixed on the mounting substrate and optically coupled with the optical fiber, and a fixing member for positioning and fixing the optical fiber to the mounting substrate, wherein at least any one of the mounting substrate and the fixing member has a positioning groove for positioning the optical fiber to the optical element, a fixing groove connected to the positioning groove, and a flat bottom shallower than the positioning groove, and the optical fiber is fixed by means of a bonding material applied in the fixing groove and held on the positioning groove.

17 Claims, 10 Drawing Sheets

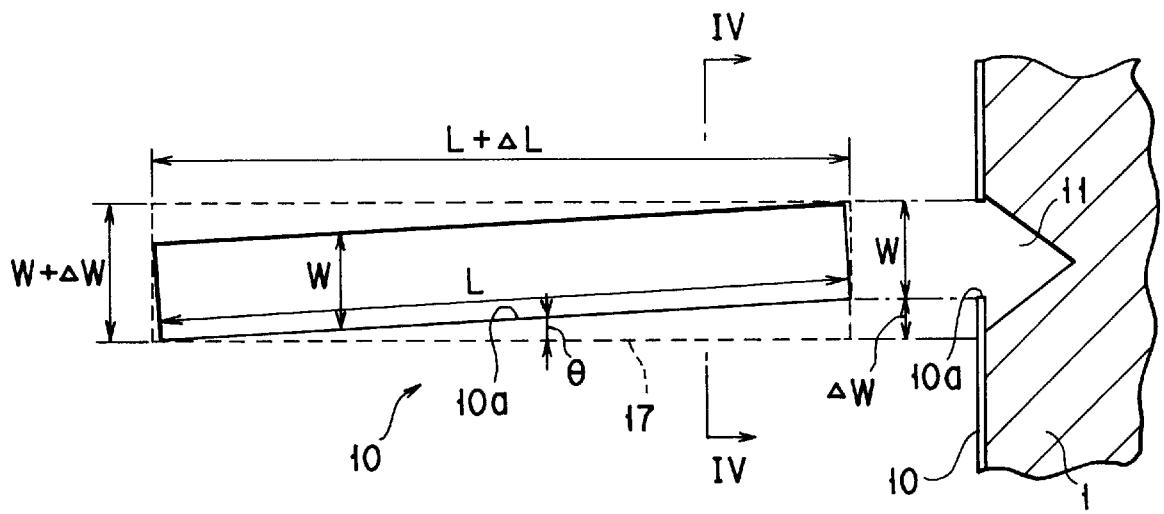
FIG. 4A
FIG. 4B
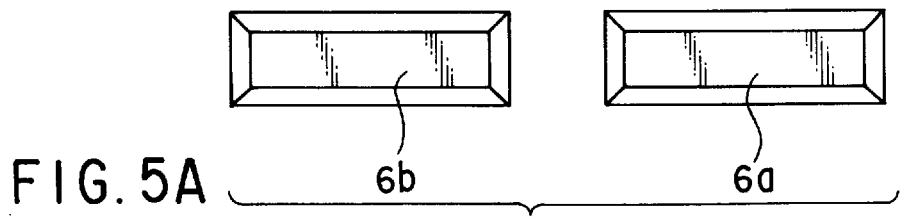
FIG. 5A
FIG. 5B

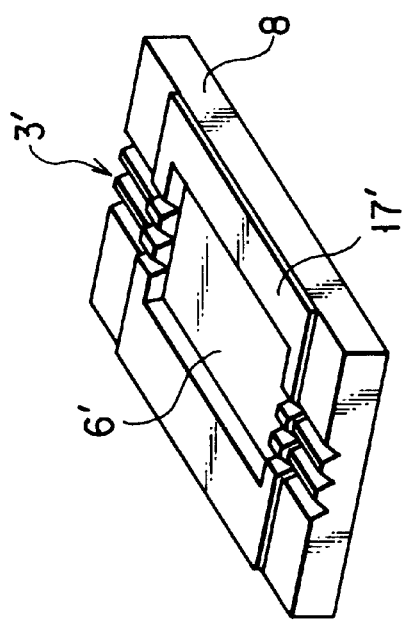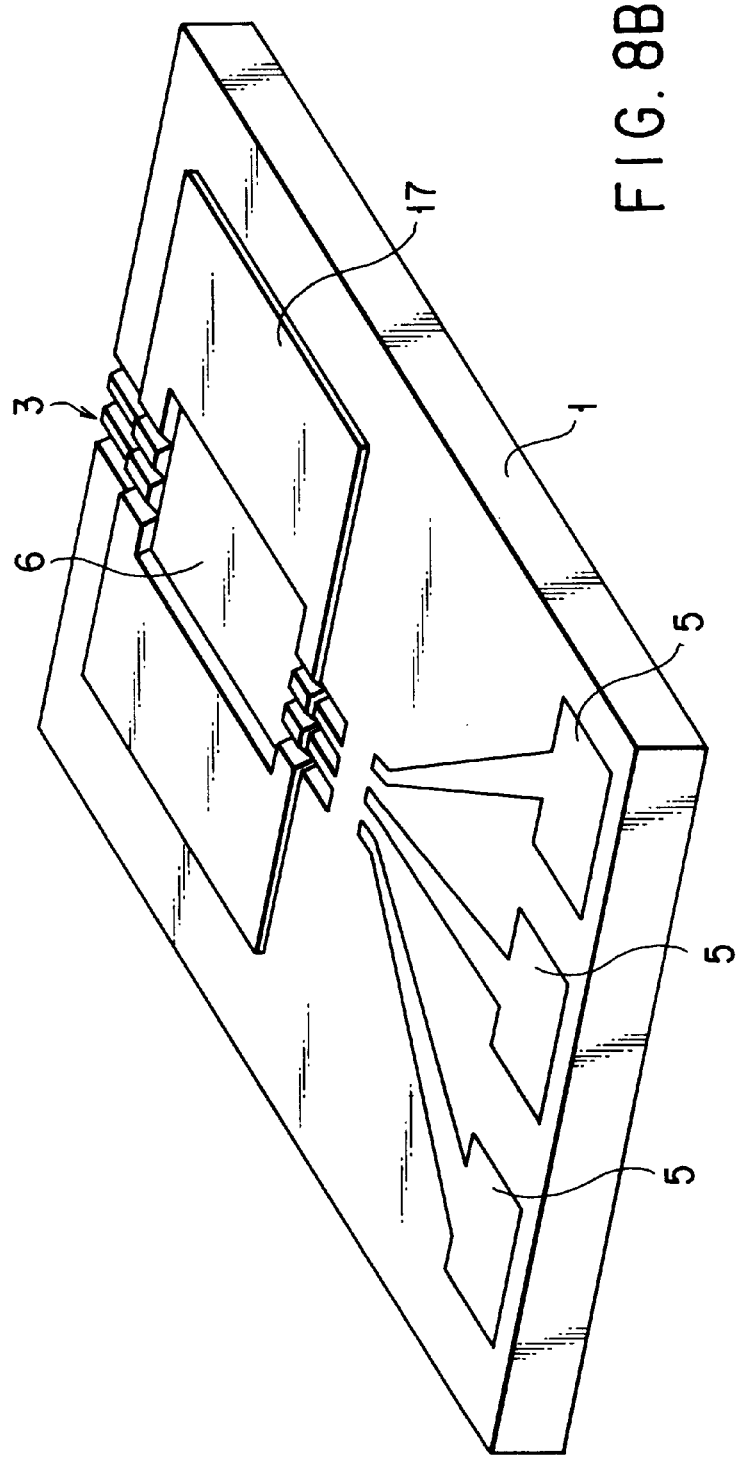

TABLE 1:

| SAMPLE | A | B | C | D | E | F | G | H | I | J | K | CONVENTIONAL EXAMPLE |
|---|---|---|---|---|---|---|---|---|---|---|---|---|
| METAL FILM | NONE | PRESENCE | PRESENCE | PRESENCE | PRESENCE | PRESENCE | NONE | PRESENCE | NONE | PRESENCE | NONE | NONE |
| BUBBLE VENT HOLE | NONE | NONE | ONE | TWO | ONE | ONE | ONE | ONE | ONE | TWO | TWO | NONE |
| CONVEX PORTION | NONE | NONE | NONE | NONE | NONE | NONE | NONE | PRESENCE | PRESENCE | PRESENCE | PRESENCE | NONE |
| KIND OF BONDING MATERIAL | SOLDER | SOLDER | SOLDER | SOLDER | SOLDER | EPOXY | EPOXY | SOLDER | EPOXY | SOLDER | EPOXY | SOLDER |
| FILLING METHOD | PREVIOUSLY FILLING | PREVIOUSLY FILLING | PREVIOUSLY FILLING | PREVIOUSLY FILLING | INJECTION | INJECTION | INJECTION | INJECTION | INJECTION | INJECTION | INJECTION | PREVIOUSLY FILLING |
| NUMBER OF LEAKS | 26 | 20 | 10 | 8 | 5 | 5 | 5 | 3 | 3 | 2 | 2 | 33 |

FIG. 13

APPARATUS HAVING OPTICAL COMPONENTS AND A MANUFACTURING METHOD THEREOF

BACKGROUND OF THE INVENTION

The present invention relates to an apparatus having optical components which is designed for use in optical communication terminal equipment or the like, more particularly, the invention relates to improvement in an apparatus comprising an optical component such as an optical fiber mounted on a single crystal substrate such as a silicon substrate.

An apparatus having optical components is used in an optical communication terminal equipment for performing information communication between public telephones and between computers. The apparatus has a silicon substrate and optical components mounted on the substrate. The optical components include a semiconductor laser, an optical fiber and the like. The semiconductor laser which is a light source and an optical fiber are optically coupled with each other with high precision.

In general, the semiconductor laser and the optical fiber must be aligned with accuracy less than 1 μm. For this reason, a silicon substrate has a V-shaped positioning groove (V groove) formed by high-precision anisotropic etching. Once set in the V groove, the optical fiber is positioned in a predetermined position.

In order to maintain the reliability of the apparatus, the semiconductor laser and optical fiber need to be sealed airtight and firmly fixed on the silicon substrate. To this end, a V-shaped fixing groove larger than the V-shaped positioning groove is provided at the middle part of the V-shaped positioning groove for receiving the bonding material. The optical fiber is fixed on the silicon substrate by means of solder material applied in the V-shaped fixing groove. And then, the fixed portion of the optical fiber and the semiconductor laser are covered with a cap or the like and sealed airtightly and watertightly.

However, an apparatus of this kind is disadvantageous in the following respects.

First, the bottom portion of the V-shaped fixing groove is so narrow that a gap is likely to exist between the bottom and the solder material exist in the V-shaped fixing groove. Thus, moisture may accumulate in the gap, possibly affecting the semiconductor laser.

Second the solder material in the V-shaped fixing groove may flow through a gap between the optical fiber and the V-shaped fixing groove into the V-shaped positioning groove. In the positioning groove, the solder material possibly contaminates an end face of the optical fiber.

Third, while forming the aforesaid V-shaped positioning groove by anisotropic etching, the etching mask may be displaced with respect to a crystal orientation of the single crystal substrate. Consequently, the V-shaped positioning groove may have a considerable size error. In other words, if the etching mask is so displaced, excessive etching happens because of the crystal orientation dependency of the etching rate due to atomic arrangement anisotropy, as will be described below.

Assume a sift angle θ is generated between the crystal orientation and the mask direction. An excessive etching width ΔW and an excessive etching length ΔL, these excessive etching widths ΔW and length ΔL are obtained from the following equations:

$$\Delta W = W(\cos\theta - 1) + L\sin\theta$$

$$\Delta L = L(\cos\theta - 1) + W\sin\theta$$

Where L is a desired length of the V-shaped positioning groove, and w is the desired width thereof.

If W=100 μm and L=10 mm and θ=0.1°, the excessive etching width ΔW will be 18 μm. Hence, the size error will approximate to ±10%. Further, if the shift angle θ is 0.5°, the excessive etching width ΔW will be 87 μm. The size error will therefore be about ±45%, not allowable any longer.

BRIEF SUMMARY OF THE INVENTION

Therefore, an object of the present invention is to provide an apparatus which can airtightly and firmly seal an optical fiber and which improved reliability.

Another object of the invention is to provide an apparatus which has no gap between a fixing groove and a bonding material after an optical fiber is set in the fixing groove with the boding material.

Still another object of the invention is to provide an apparatus which can effectively prevent a boding material from flowing from the fixing groove into a1 fiber-positioning groove in the process of fixing an optical fiber in the fixing groove with the boding material.

Further, object of the present invention is to provide an apparatus which can reduce a size error of a fiber-positioning groove resulting from a displacement between crystal orientation of a single crystal substrate and an etching mask, and which can position and hold an optical fiber and a light emitting element (e.g., a semiconductor laser) or a light receiving element (e.g., a photodiode) with high precision.

To achieve the above object, the present invention provides an apparatus comprising:

a mounting substrate;

an optical fiber held on the mounting substrate;

a optical element fixed on the mounting substrate, and is optically coupled with the optical fiber; and a fixing member for positioning and fixing the optical fiber to the mounting substrate, wherein at least any one of the mounting substrate and the fixing member have a positioning groove for positioning the optical fiber to the optical element, a fixing groove connected to the positioning groove, and a flat bottom shallower than the positioning groove; and the optical fiber is fixed by means of a bonding material applied in the fixing groove and held on the positioning groove.

Since the fixing groove has a flat bottom, a gap is hardly made between the bonding material filled in the fixing groove and the fixing groove. Since the fixing groove is shallower than the positioning groove, the bonding material hardly flows into the positioning groove from a gap between the fixing groove and the optical fiber. The apparatus can therefore have high reliability.

The mounting substrate is a single crystal substrate, and the positioning groove extends along a crystal orientation (direction) of the mounting substrate. Preferably, a plurality of positioning groove are provided extending along the extending direction of the optical fiber, and the fixing groove is provided between a pair of positioning grooves and connected to these positioning grooves. Preferably, three or more positioning groove may be provided, and two or more fixing groove may be provided along the optical fiber and be located between the pair of positioning grooves.

With the above construction it is possible to make smaller a positional shift of the optical fiber resulting from crystal orientation dependency of the mounting substrate, than in the case where the optical fiber is held in one continuous positioning groove. Therefore, the optical fiber and light emitting/receiving elements, (i.e., laser diode and photodiode or the like) can be mutually positioned with high precision.

Further, the present invention provides a method of manufacturing an apparatus, comprising the steps of:

forming a positioning groove for positioning an optical fiber on a single crystal substrate, the positioning groove divided into at least two parts in a direction in which the optical fiber extends; and forming a fixing groove, between the at least two pats of the positioning groove the fixing groove connecting the positioning grooves and filled with a bonding material for fixing an optical fiber.

Since the positioning groove is formed in a manner of dividing the groove in the above method, a positioning error of the optical fiber is minimized. Further, since the fixing groove is provided between divided positioning grooves, it can be a flat bottom and can be shallower than the positioning groove.

It is preferable that the fixing groove be formed in a metallic layer by means of evaporation. In this case, the optical fiber can be more firmly fixed by the bonding material.

Preferably, the fixing member or the substrate, or both may have one or more vent hole which penetrates through the fixing groove. With this construction, bubbles in the bonding material can be released through the vent hole, and also, the amount of bonding material can be readily adjusted. Further, in the case where two or more vent holes are provided, the bonding material can be applied though one vent hole and discharged through another vent hole. This facilitates the filling of bonding material.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are reference views to explain displacement between a mask pattern and a crystal orientation;

FIG. 5A and FIG. 5B are views explaining a process of forming a V-shaped positioning groove according to a modification of the first embodiment;

FIG. 8A is a perspective view showing a mounting substrate used in a third embodiment of the invention;

FIG. 8B is a perspective view showing another fixing substrate for use in the third embodiment of the invention;

FIG. 13 is a table showing an effect of the present invention.

DETAILED DESCRIPTION OF THE INVENTION

First to fifth embodiments according to the present invention will be described below with reference to the accompanying drawings.

(First embodiment)

Figure 1:
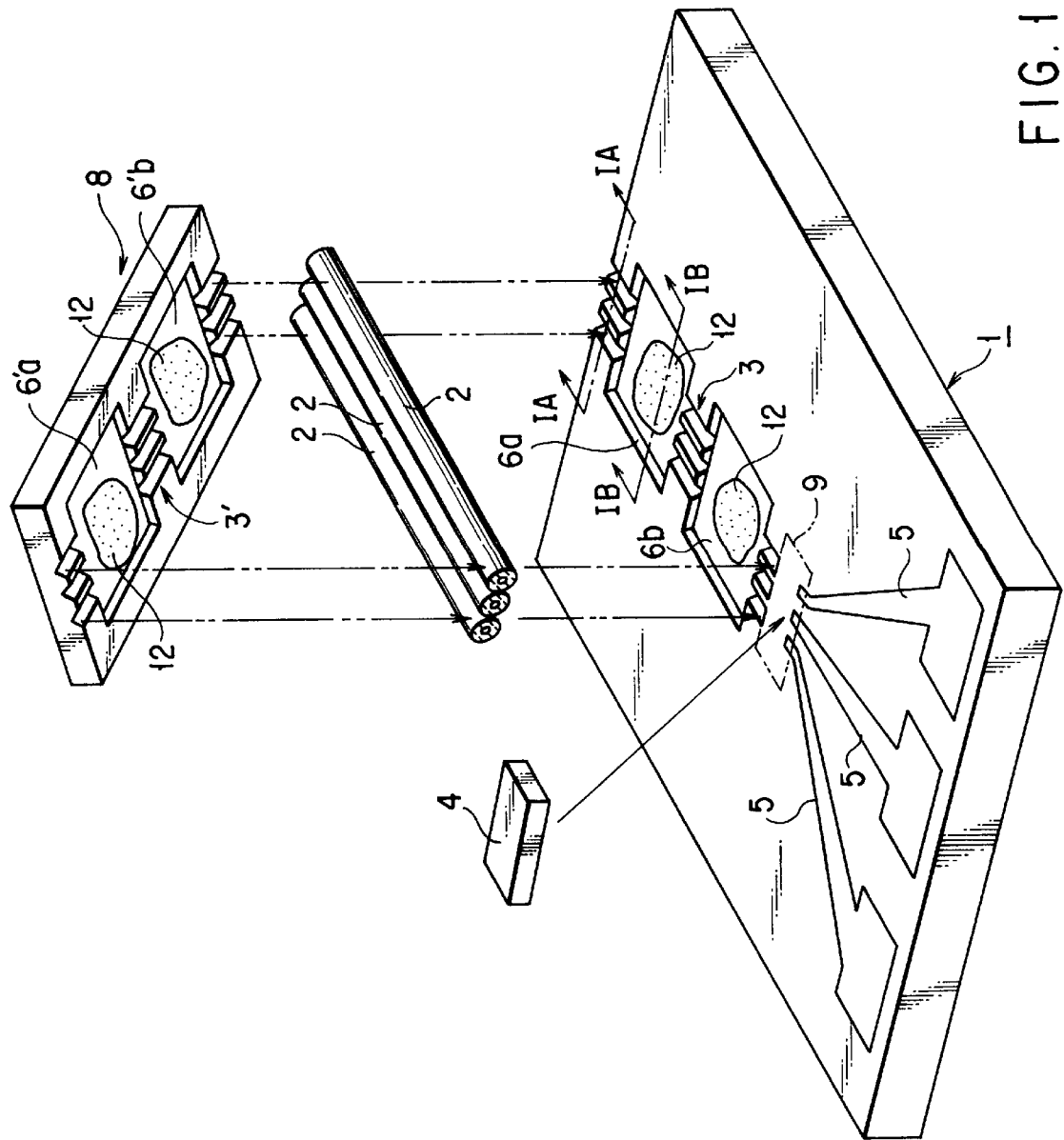
FIG. 1 is an exploded perspective view showing an apparatus according to a first embodiment of the present invention.

FIG. 1 is an exploded perspective view showing an apparatus having optical components according to the first embodiment.

In FIG. 1, a reference numeral 1 denotes a mounting substrate comprising a single crystal silicon substrate. The mounting substrate 1 is formed with a plurality of V-shaped positioning grooves 3 for holding optical fibers 2 to a predetermined position, and a wiring pattern 5 for mounting a laser diode 4 which is optically coupled with the optical fibers 2.

The V-shaped positioning grooves 3 are provided with first and second fixing grooves 6a and 6b at two portions separating from each other in the middle parts of the V-shaped positioning grooves 3. These first and second fixing grooves 6a and 6b are respectively filled with a solder material 12 for fixing the optical fibers 3.

Figure 2A:
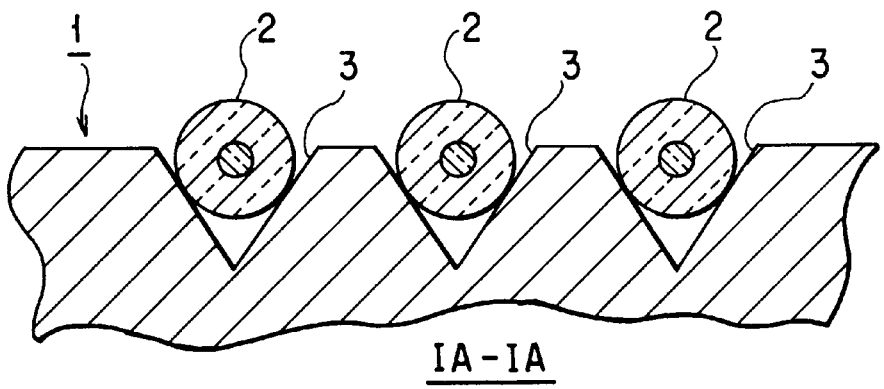
FIGS. 2A and 2B are cross sectional views of the substrate shown in FIG. 1.
Figure 2B:
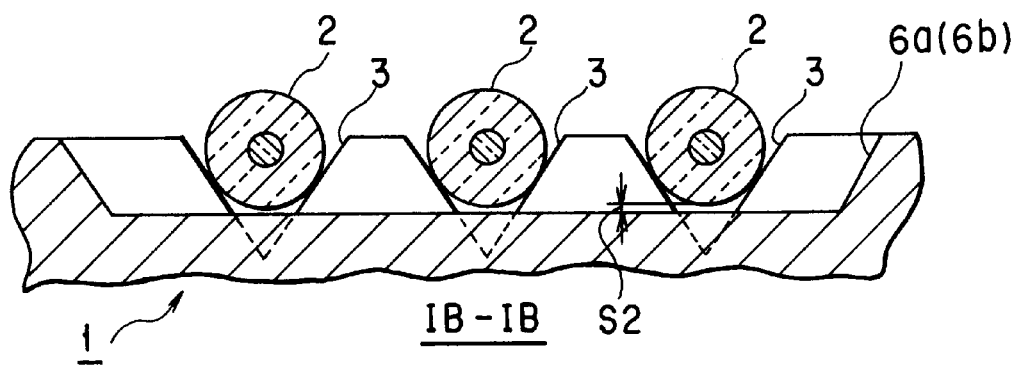

FIG. 2A shows a cross sectional view of the V-shaped positioning groove 3 taken along the line IA—IA in FIG. 1, and FIG. 2B shows a cross sectional view of the first fixing groove 6a taken along the line IB—IB in FIG. 1. The second fixing groove 6b is omitted in FIG. 2B, since it has the same shape as the first fixing groove 6a.

As seen from FIG. 2B, being different from the V-shaped positioning grooves 3, the fixing groove 6a has a flat bottom and is formed shallower than the V-shaped positioning grooves 3

The optical fibers 2 are fixed on the mounting substrate 1 by means of a fixing substrate 8 as shown in FIG. 1. The fixing substrate 8 is formed with a V-shaped positioning grooves 3' and fixing grooves 6'a and 6'b which have the same dimension as those formed in the mounting substrate 1. The optical fibers 2 are sandwiched between V-shaped positioning groove 3 and fixing grooves 6a and 6b formed on the mounting substrate 1 and V-shaped positioning groove 3' and fixing grooves 6'a and 6'b formed on the fixing substrate 8, so that the optical fibers 2 are positioned to a predetermined position. The optical fibers 2 are fixed between the mounting substrate 1 and the fixing substrate 8 by means of a solder material 12 applied in a space defined by the fixing grooves 6a, 6b and 6'a, 6'b.

On the other hand, The laser diode 4 is bonded onto a predetermined position 9 of the mounting substrate 1, as shown in FIG. 1 and the optical fibers 2 and the laser diode 4 are optically coupled. Thereafter, fixing portions of the optical fibers 2 and laser diode 4 are covered with a cap (not shown) in order to prevent dust or moisture, and thus, the fixing portions are sealed airtightly and watertightly.

Next, a forming process of the V-shaped positioning grooves 3 and fixing grooves 6a and 6b, which are constituent features of the present invention, will be described below. A forming process of the V-shaped positioning groove 3' and fixing groove 6'a and 6'b formed in the fixing substrate 8 is the same as the forming process which will be described below, the details thereof is omitted.

FIGS. 3A to 3D are views showing a process of forming the V-shaped positioning groove 3 and the fixing grooves 6a and 6b.

In FIG. 1, there have been shown a plurality of the V-shaped positioning grooves 3. However, in order to simplify the explanation, FIG. 3A to FIG. 3D each show the case where single V-shaped positioning groove 3 is formed.

Before explaining FIG. 3A to FIG. 3D, a problem of a conventional V-shaped forming process will be described below with reference to FIG. 4A and FIG. 4B.

In FIG. 4B, a reference numeral 10 denotes an etching mask. The etching mask 10 is formed with a rectangular mask pattern 10a which has a length L and a width W, as shown by a solid line of FIG. 4A. Here, the mask 10 (mask pattern 10a) is shifted by a predetermined angle θ with respect to the crystal orientation of the mounting substrate 1.

If etching is carried out in a state that the mask is shifted as described above, excessive etching is possibly happen as shown by a dotted line of FIG. 4A due to crystal orientation dependency as described in the prior art. As a result, a V-shaped positioning groove 11 is formed with a dimensional error of ΔW and ΔL with respect to a desired dimension.

In general, a crystal orientation of a single crystal substrate (Si wafer) is confirmed by an X-ray diffractometry. However, the confirmation accuracy is about ±0.5° if measured on the surface of the wafer, or ±1° if using orientation flat which indicates a crystal direction in the wafer surface. Even in the case of a special high accuracy apparatus, it is substantial limitation that the confirmation accuracy is ±0.1°. As a result, an allowable orientation error of the single crystal substrate such as Si cannot be smaller than about ±0.1° as synthetically crystallographic axis accuracy.

In an example shown in FIG. 4A and FIG. 4B, assuming that an error in the crystal orientation and the mask direction is set as 0.1°, the V-shaped positioning groove width W=100 μm, and the V-shaped positioning groove length L=10 mm, a width error ΔW in the V-shaped positioning groove will be 18 μm (±9%) as described in the prior art, and therefore, a relatively high size error is caused. In order to prevent such an error, the conventional technique employs steps such that, the single crystal substrate is cleaved, and then, the mask direction is aligned with a cleavage plane of the crystal substrate.

However, it is difficult to apply the aforesaid conventional technique to a general semiconductor manufacture process, and there is a disadvantage that productivity is generally very low. More specifically, since a process of using a non-circular wafer must be carried out, special facilities are required for manufacturing an apparatus. As a result, a basic investment becomes vague. Further, in the case of the non-circular wafer, not only resist coat variation is likely to occur therein, but also a process yield is possibly lowered due to particles (rubbish) generated by chipping the wafer. Thus, a productive cost becomes high, therefore, merits of this kind of mounting apparatus are lost.

According to the present embodiment shown in FIG. 3A to FIG. 3D, the aforementioned problems can be solved.

Figure 3A:
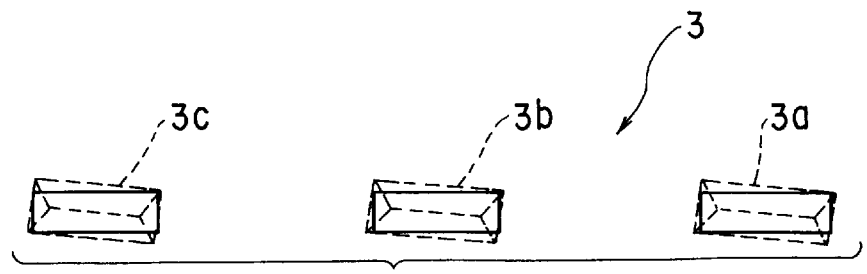
FIGS. 3A, 3B, 3C and 3D are views showing a process of forming a V-shaped positioning groove and a fixing groove.

First, as shown in FIG. 3A, a V-shaped positioning groove 3 is formed by anisotropic etching. In this embodiment, the V-shaped positioning groove, which has, for example, a width W of 100 μm and a length L of 10 mm, is divided into three short grooves as shown by reference numerals 3a, 3b and 3c of FIG. 3A. A length of respective short grooves 3a, 3b and 3c is 1/10 of the length of the V-shaped positioning groove 3, that is, 1 mm.

A solid line shown in FIG. 3A denotes a mask pattern for forming the respective short grooves 3a, 3b and 3c. Here, a shift angle between the crystallographic axis and the mask pattern is set at 0.1° as the case of FIG. 4A. Since length of short grooves 3a, 3b and 3c is 1/10 of the case shown in FIG. 4, a width error ΔW in each groove is 1.8 μm, and which is considerably small.

To finish the V-shaped positioning groove with a width of 100 μm, the groove width W may be designed to 99 μm, so that finished width of the V-shaped positioning groove becomes 99 to 100.8 μm. Therefore, it is possible to form the V-shaped positioning groove having a width of 100±1 μm.

Figure 3B:
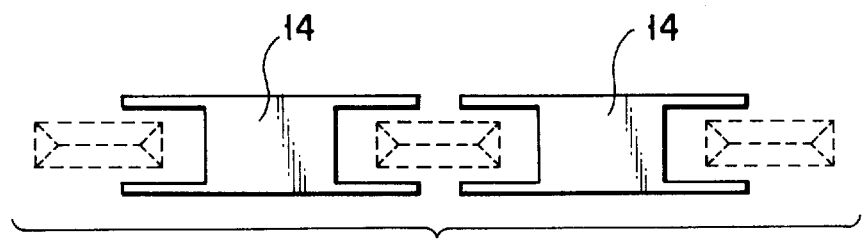

Next, the fixing grooves 6a and 6b are formed in the process showed in FIG. 3B.

First, a fixing groove mask pattern 14 is formed so that its both end portions surround the end portions of the short grooves 3a to 3c. FIG. 3B shows a state that fixing grooves 6a and 6b are formed by anisotropic etching using the mask pattern 14.

Etching for forming these fixing grooves 6a and 6b is carried out such that a depth of the fixing grooves 6a and 6b are shallower than the V-shaped positioning groove 3 (short grooves 3a to 3c). The depth of the fixing grooves 6a and 6b may designed that the bottoms of the grooves 6a and 6b do not contact with the optical fiber 2. For example, if a center of a silica based fiber (125 μmφ) is set as a height of the substrate surface, it is enough that the fixing grooves has a depth of about 100 μm.

As described above, both end portions of the fixing groove mask pattern 14 have been formed so as to surround the short grooves 3a to 3c without contacting with them, and is not formed into a simply rectangular shape. Thus, it is possible to prevent side faces of respective short grooves 3a to 3c from being crushed.

Further, in this embodiment, the V-shaped positioning groove 3 is formed in a manner of being divided into three short grooves 3a to 3c, and thereafter, the fixing grooves 6a and 6b are formed. Thus, it is possible to form the fixing grooves 6a and 6b shallower than the V-shaped positioning groove 3.

Specifically, in the case of forming the fixing groove on the middle part of the V-shaped positioning groove 11 after the long V-shaped positioning groove 11 (see FIG. 4A) is formed, it is, as a matter of course, impossible to make flat the bottom of the fixing groove unless etching is carried out with a depth more than the long V-shaped positioning groove 11. Also, in the case the V-shaped positioning groove is formed after the fixing groove having the flat bottom has been formed, the bottom of the fixing groove must be etched with a shape of V.

Therefore, according to the process of the present embodiment, it become possible to form the fixing grooves 6a and 6b having flat bottoms shallower than the V-shaped positioning groove 3 for the first time.

With the V-shaped positioning groove 3 and the fixing grooves 6a and 6b thus formed, the optical fiber 2 is positioned by means of these short grooves 3a to 3c, and then, is fixed by means of the solder material applied in the fixing grooves 6a and 6b.

Figure 3C:
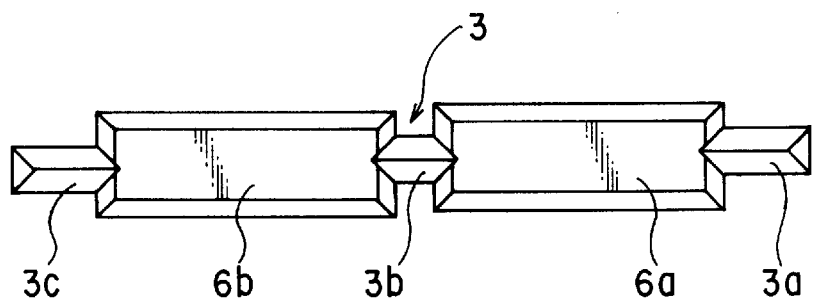
Figure 3D:
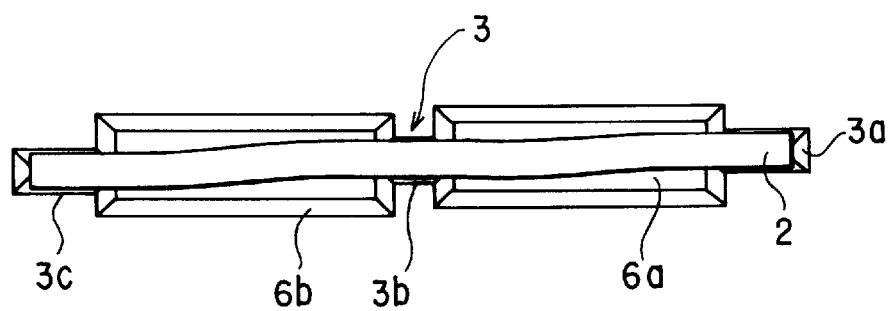

FIG. 3D shows a state that the optical fiber 2 is set in the V-shaped positioning groove 3 (short grooves 3a to 3c). In FIG. 3b, there has been exaggeratedly shown a warp due to offset between respective short grooves 3a to 3c. The offset is equivalent to the aforesaid width error ΔW (1.8 μm), and therefore, in actual case, the optical fiber 2 is not so warped.

As is evident from the above description, according to the embodiment, the positioning accuracy of the optical fiber 2 is determined depending upon plurality of the short grooves 3a to 3c. Therefore, even in the case where the entire length of V-shaped positioning groove 3 is considerably long, the accuracy for positioning the optical fiber 2 can be sufficiently secured.

The inventors of the present invention have made the following trial manufacture. More specifically, 240 V-shaped positioning grooves 3 having a groove width of 100 μm and the entire length of 75 mm were simultaneously formed on single wafer, and then, processing was carried out with respect to 25 wafers. As a result, a excellent result was obtained such that 95% or more grooves 3 had an error of ±1% or less, and 60% or more grooves 3 had an error of ±0.5% or less. Also, when another lot of the V-shaped positioning groove was formed in the same process as described above, the same result was obtained. Moreover, even in the case where the V-shaped positioning groove having the entire length of 100 mm was formed, the same result was obtained.

In the present embodiment, the groove length often respective short grooves 3a to 3c is set as 1 mm which is ten times as much as the groove width (100 μm). In other words, if the crystallographic axis error is 0.1°, the groove length may be set within ten times as much as the groove width in order to set the groove width error to about 1%. Further, in order to further improve a V-shaped processing accuracy, the ratio may be made small, and may be set within five times, for example. In this case, a support force of the optical fiber 2 is weak. This problem is solved by increasing the number of short grooves formed on the middle portion of the V-shaped positioning groove.

The order of forming the short grooves 3a to 3c and the fixing grooves 6a and 6b may be converse to the case shown in FIGS. 3A to 3D. More specifically, first, in a process shown in FIG. 5A, the fixing grooves 6a and 6b are formed, and thereafter, in a process shown in FIG. 5B, a mask pattern 14' may be formed so as to form the fixing grooves 6a and 6b (not shown). In this case, the mask pattern 14' has an end portion narrower than the fixing grooves 6a and 6b, and is not formed into a simply rectangular shape. This prevents the side face of the respective fixing grooves 6a and 6b from being crushed during the forming the grooves 3a to 3c.

As described above, according to the present embodiment, the optical fiber 2 is positioned with high accuracy, and besides, the bottom of the fixing grooves 6a and 6b are formed like a flat, so that a bubble or the like is hard to be accumulated.

Further, the depth of the fixing grooves 6a and 6b is shallower than the V-shaped positioning groove 3, and thereby, the following effect can be obtained.

First, it is possible to effectively prevent the solder material encapsulated in the fixing grooves 6a and 6b from flowing into the V-shaped positioning groove 3.

Figure 2C:
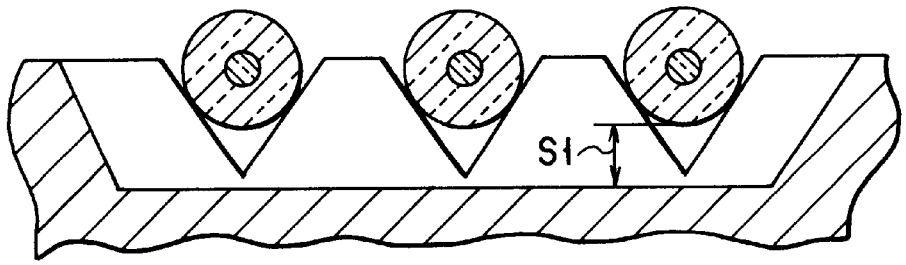
FIG. 2C is a reference view to explain an effect of the first embodiment.

More specifically, in the case where the fixing groove has a depth larger than the positioning V-shaped positioning groove, a great gap S1 is generated as shown in FIG. 2C. Thus, there is the high possibility that the solder material flows into the V-shaped positioning groove from the gap S1. In this case, there is the possibility that the solder material reaches the end face of the optical fiber and adheres to a light guiding face of the optical fiber.

On the contrary, according to the present embodiment, as shown in FIG. 2B the gap S2 becomes smaller in dimension than FIG. 3C. Therefore, it is possible to effectively prevent the solder material from flowing over through the gap S2.

Also, since the fixing groove 6a and 6b are formed to have the depth shallower the V-shaped positioning groove 3, the mounting apparatus can be made thin. Therefore, miniaturization of the apparatus can be achieved. Further, in the case of making the apparatus exothermic from the backside of the apparatus, an exothermic performance of the apparatus is improved.

Note that, in the embodiment, the solder material 12 has been used as a boding material for fixing the optical fiber 2. The bonding material is not specially limited to the solder material, and an organic based bonding material such as epoxy resin or the like may be used.

Moreover, in this embodiment, the optical fiber 2 has been optically coupled with the laser diode 4 which functions as a light emitting element. The optical fiber may be optically coupled with a light receiving element, for example, a photodiode.

Figure 6A:
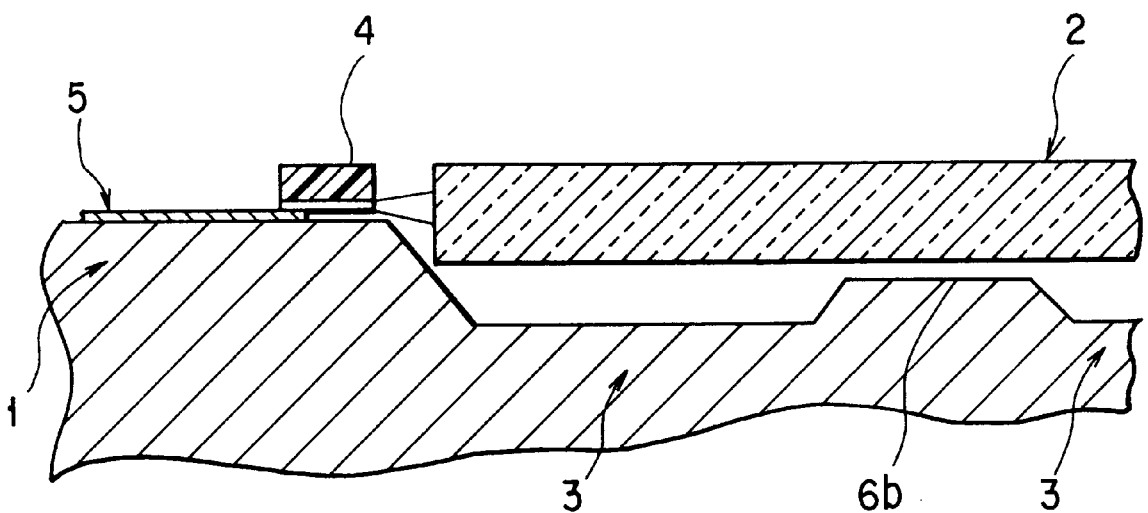
FIGS. 6A and 6B are views showing a modification of the first embodiment.
Figure 6B:
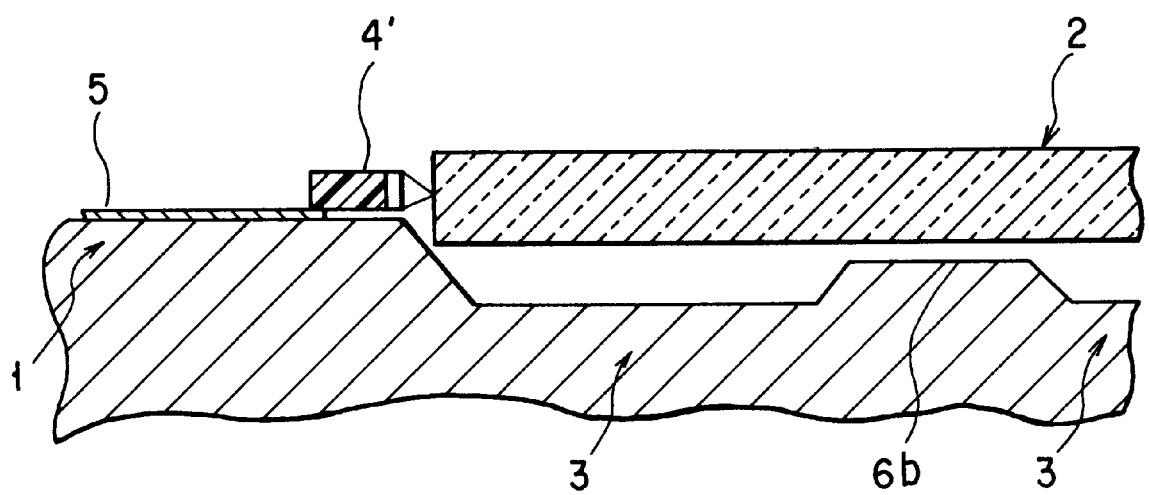

FIG. 6A shows an optically coupled state of the laser diode 4 and the optical fibers 2, and FIG. 6B shows an optically coupled state of a photodiode 4 and the optical fiber 2.

In FIG. 6A, as described above, the light emitting portion of the laser diode 4 is alighted with the central portion of the optical fiber 2 with high precision, and most of light emitted from the laser diode 4 are led into the optical fiber 2.

On the other hand, even the construction shown in FIG. 6B, the light receiving face of the photodiode 4 is alighted with the central portion of the optical fiber 2 with high precision. And then, an optical signal from the optical fiber is led to the light receiving face of the photodiode 4.

Therefore, the construction of the first embodiment is applicable not only to the case of using the light emitting element but also to the case of using the light receiving element, or is applicable to the case where the former and the latter are simultaneously used.

In the case where both light emitting element and light receiving element are mounted on the identical mounting substrate 1, these elements may be optically coupled with different optical fibers 2, or each of these elements may be optically coupled with the identical optical fiber 2 so that both transmission and reception are performed by means of one optical fiber 2.

In the case of performing the transmission and reception by single optical fiber 2, an optical system for dividing a transmitting signal and a reception signal, for example, a half-silvered mirror or a beam splitter may be mounted on the mounting substrate 1.

(Second embodiment)

Figure 7A:
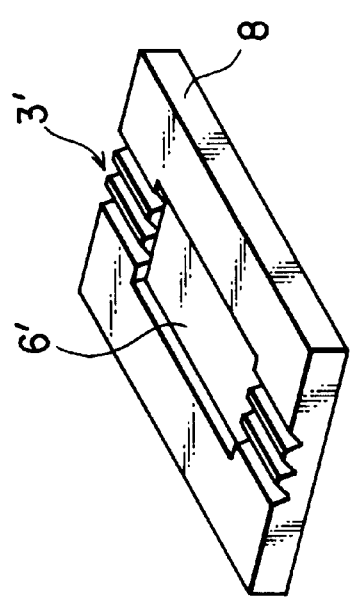
FIG. 7A is a perspective view showing the mounting substrate incorporated in a second embodiment of the present invention.
Figure 7B:
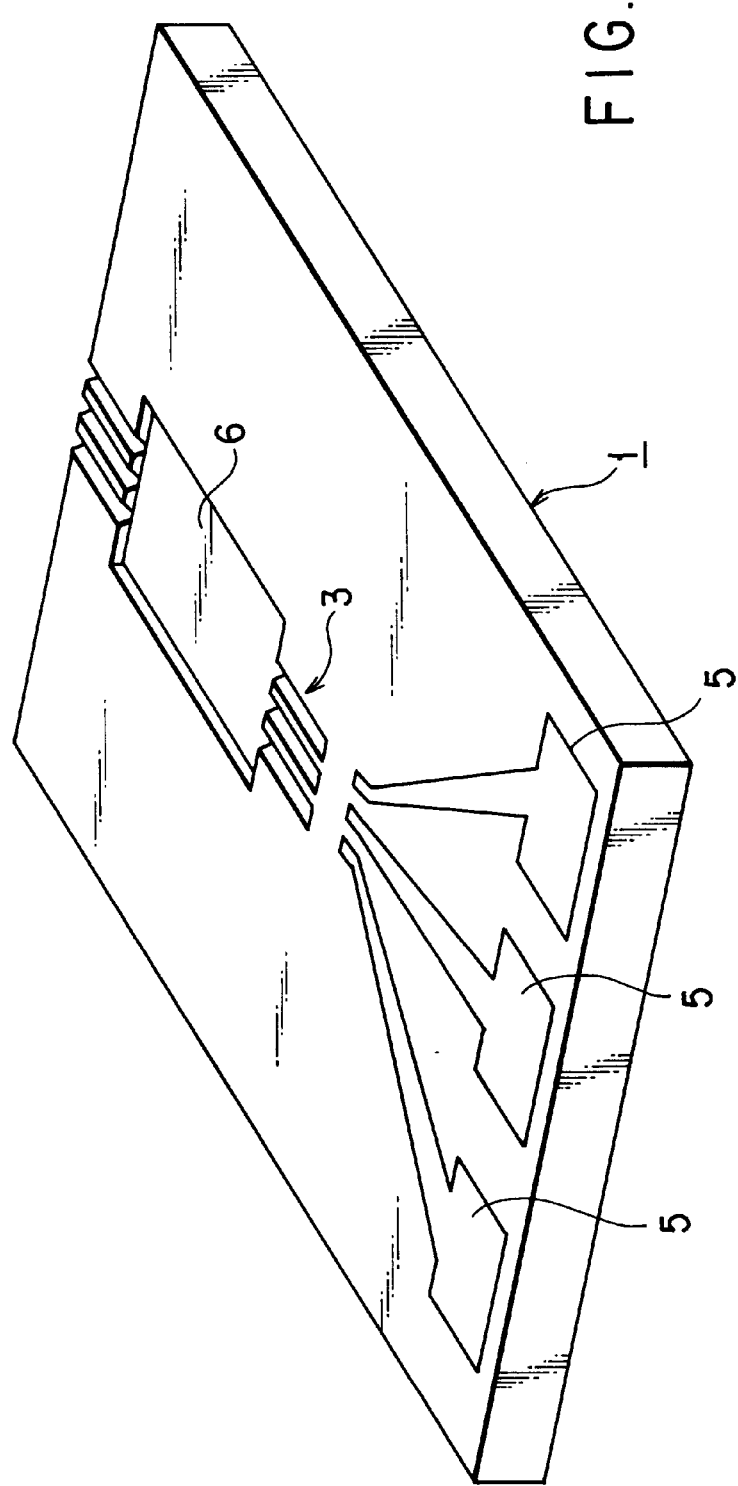
FIG. 7B is a perspective view of a fixing substrate used in the second embodiment of the invention.

FIG. 7A and FIG. 7B show the second embodiment according to the present invention. Same reference numerals are used to designate the same components as the first embodiment, and the details thereof are omitted. Also, in FIG. 7A and FIG. 7B, the optical fiber 2 and the laser diode 4 are not illustrated.

As shown in FIG. 7A, different from the fixing groove of the first embodiment, only one fixing groove 6 is formed on the middle part of the V-shaped positioning groove 3. However, this fixing groove 6 is formed shallower than the V-shaped positioning groove 3 same as the first embodiment.

Further, as shown in FIG. 7B, a fixing groove 6' formed on the fixing substrate 8 has the same shape as that of the fixing groove 6 formed on the mounting substrate 1.

These V-shaped positioning groove 3 (3') and fixing groove 6 (6') are formed according to the same process as the aforesaid first embodiment, and has the same effect as described in the first embodiment.

(Third embodiment)

FIG. 8A and FIG. 8B show the third embodiment according to the present invention. Same reference numerals are used to designate the same components as the second embodiment (FIG. 7A, FIG. 7B), and the details thereof are omitted.

According to the third embodiment, there is provided a metallic thin film 17 (17') which covers an inner surface of the fixing groove 6 (6'), in addition to the constructions of the second embodiment.

A manufacture process is basically the same as that of the first embodiment, and further, a process for forming the metallic thin film 17 (17') is added thereto. This process is carried out together with formation of the wiring pattern 5. More specifically, the V-shaped positioning groove 3 and the fixing groove 6 are formed, and thereafter, a PEP process for forming the wiring pattern 5 and the metallic thin film 17 is carried out. Thereafter, titanium of 100 nm, platinum of 50 nm and gold of 500 nm are continuously vaporized, and then, steps of removing a resist and metal, a so-called lift-off method, is conducted, thereby the metallic thin film 17 is formed on the substrate.

With the construction as described above, since the metallic thin film 17 and 17' are melted together with the solder material 12 at the interface in the fixing groove 6. Therefore, stably secure soldering can be provided.

(Fourth embodiment)

Figure 9:
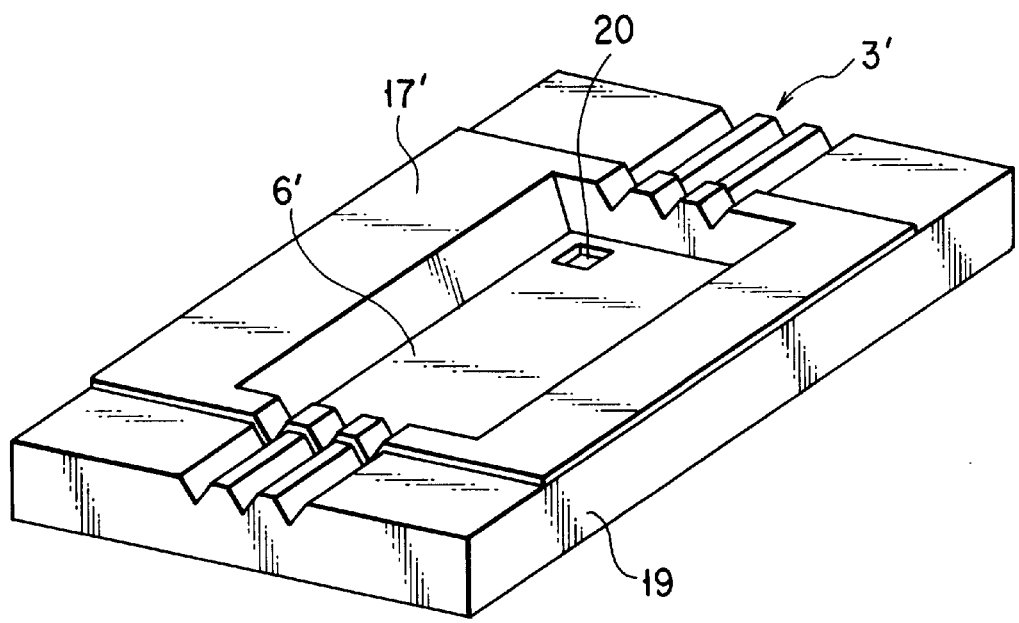
FIG. 9 is a perspective view showing a fixing substrate used in a fourth embodiment of the invention.

FIG. 9 shows the fourth embodiment according to the present invention. The fourth embodiment relates to a modification example of the fixing substrate 8. For this reason, illustration and explanation about other construction of the apparatus are omitted.

A fixing substrate 19 of the fourth embodiment is provided with a bubble vent hole 20 which penetrates through the substrate 19 and the metallic thin film 17', in addition to the construction of the fixing substrate 8 of the third embodiment. The bubble vent hole 20 is formed by carrying out PEP process and anisotropic etching before forming the metallic thin film 17'. The bubble vent hole 20 has a size of 1 mm (1.5 mm at an opening on the side opposite to the fixing groove 6'.

With the construction as described above, it is possible to effectively release a bubble contained in the solder material filled in the fixing grooves 6 and 6' through the bubble vent hole 20. Further, by properly selecting the size of the bubble vent hole 20, the excessive solder material can be ejected through the hole 20. Therefore, it is possible to prevent the solder material from flowing over, in particular, into the fixing groove 3 and 3'.

In this case, a proper size of the hole 20 is decided such that, while the solder material is ejected from the hole 20, the solder material is stopped flowing from the gap between the V-shaped positioning groove 6 and the optical fiber 2 by surface tension of the solder material. Therefore, the bubble vent hole 20 may be larger than the total size of gap defined by the V-shaped positioning groove 3 and the optical fiber 2. However, considering that the hole is easily formed, the bubble vent hole 20 has, preferably, a rectangular shape whose one side is 0.2 to 0.3 mm or more.

The bubble vent hole 20 can be formed according to mechanical processing such ultrasonic processing or laser processing. Also, the hole 20 may be formed according to PEP and anisotropic etching employed for forming the groove. If PEP and anisotropic etching are employed, a dimensional accuracy can be securely improved, and a crack can be prevented from being generated.

Further, with the construction as described above, at first, the optical fiber is pressed against the mounting substrate 1 by means of the fixing substrate 19, and thereafter, the solder material is applied into the hole 20. This serves to fill the solder material with restricting a bubble from remaining.

Moreover, in place of the solder material, an organic filler, for example, an epoxy resin can be used. In this case, the epoxy resin can be applied without making temperature higher than the case of the solder material. In the case of applying organic, the metallic thin film 17' do not need.

A word "bonding material" means to include both the epoxy resin and the solder material.

Figure 10:
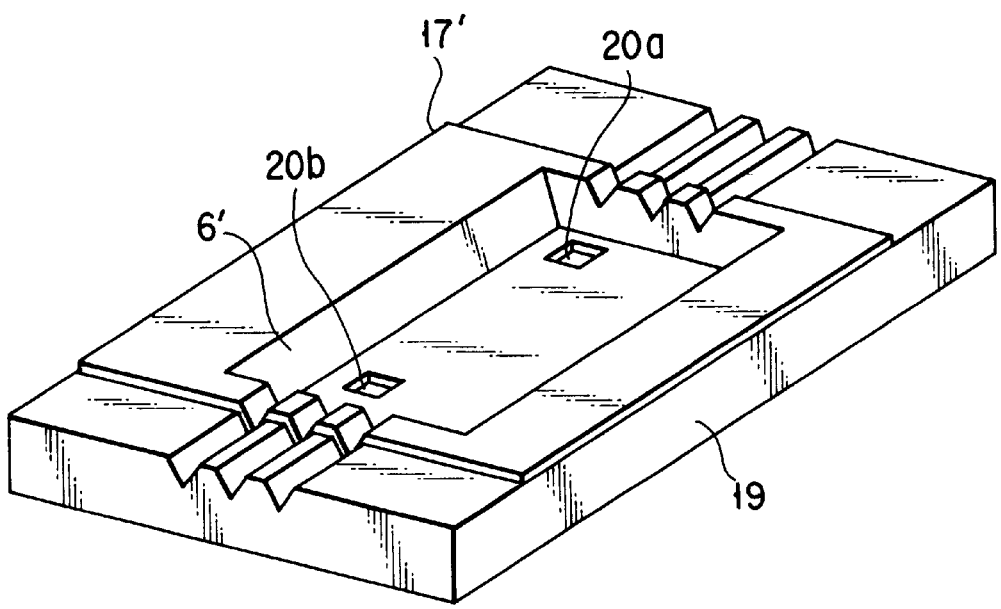
FIG. 10 is a perspective view showing another fixing substrate that may be used in the fourth embodiment.

As shown in FIG. 10, a plurality of bubble vent holes 20*a* and 20*b* may be provided in the fixing groove 6'. With the construction, it is possible to inject the bonding material into one hole 20*a* while ejecting an excessive bonding material from the other hole 20*b*. This serves to effectively prevent a bubble from being remaining in the bonding material.

This fourth embodiment is also applicable to the construction in which two fixing grooves 6'*a* and 6'*b* are provided on the fixing substrate 8 (see FIG. 1) of the first embodiment. In this case, the bubble vent hole may be provided in each of the fixing grooves 6'*a* and 6'*b*.

(Fifth embodiment)

Figure 11:
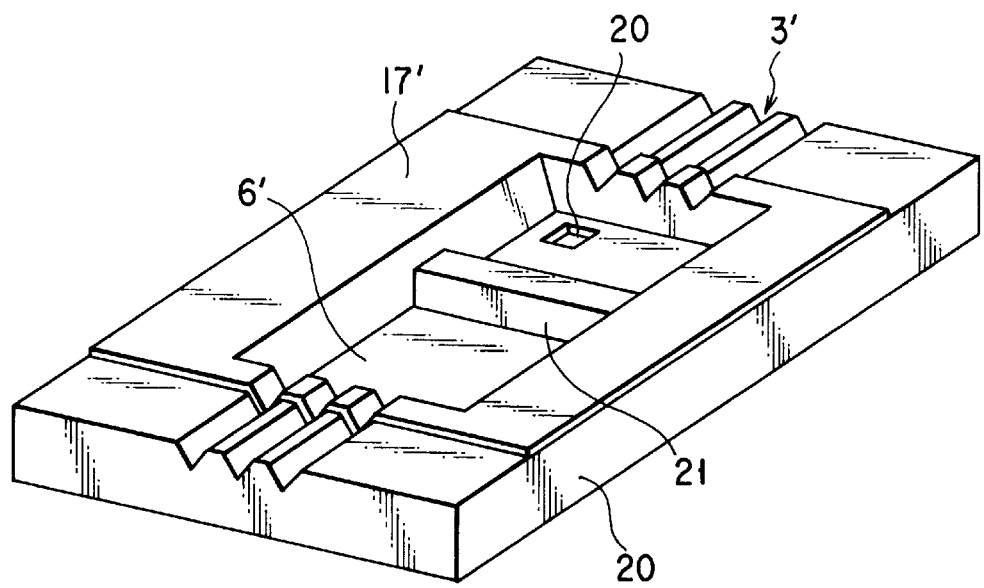
FIG. 11 is a perspective view showing a fixing substrate used in a fifth embodiment of the invention.

FIG. 11 is a perspective view showing a construction of a fixing substrate of an optical mounting component according to the fifth embodiment. Same reference numerals are used to designate the same components as the third embodiment, and the details thereof are omitted.

According to the fifth embodiment, the fixing groove 6' is provided with a convex portion 21 at the center part thereof. The convex portion 21 is formed along a direction perpendicular to the V-shaped positioning groove 3' so as to divide the fixing groove 6' into two parts.

The convex portion 21 is formed as a result of the following two steps for forming the fixing groove 6'. First, the fixing groove 6' is formed in a state of being divided into two. Next, by etching a portion between two divided portions, there can be formed the convex portion 21 having a desired height. The convex portion 21 may have any other height so long as it does not contact with the optical fiber 2.

With the above construction, the bonding material is injected into the hole 20 formed corresponding to one part of the fixing groove 6', and flows into the other part of the fixing groove 6' in a state of being squeezed by means of the convex portion 21. Therefore, a remaining of bubble can be securely restricted.

Further, if the same convex portion is formed in the fixing groove 6 of the mounting substrate 1 at the position corresponding to the convex portion 21, a greater effect can be obtained. Also, as described before, the metallic thin film 17' may not be formed in the case where organic such as epoxy resin is filled into the fixing groove as a bonding material.

The fixing substrate is also applicable to the mounting substrate having the first and second fixing groove as the first embodiment.

Figure 12:
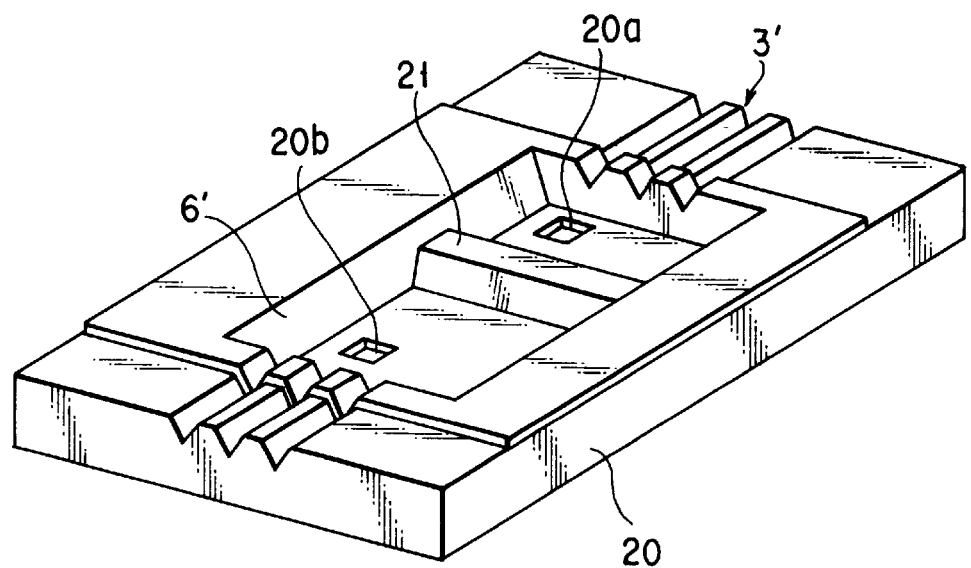
FIG. 12 is a perspective view showing another fixing substrate that may be used in the fifth embodiment.

Further, as shown FIG. 12, a plurality of holes may be provided in the fixing groove.

(Effects of first to fifth embodiments)

FIG. 13 is a table showing inspection results of samples prepared according to each embodiment.

The inspection was made with respect to 11 samples (A to K) and a conventional one, in a manner of varying the inspection items such as presence of metallic thin film, bubble vent hole and convex portion, kind of bonding material, and filling method. In this case, the bonding material is a solder material or epoxy resin. The filling method includes a "previous filling method" of filling the bonding material in the fixing groove before the optical fiber is set in, or an "injection method" of injecting the bonding material from the aforesaid bubble vent hole.

In either filling method, in the case where the solder material is used, the substrate temperature was increased up to 280° C.; on the other hand, in the case where the epoxy resin is used, the epoxy resin was filled at a room temperature, and was solidified at 100° C.

In the previous filling method, the bonding material was set to an amount which is 5% more than a volume of a space defined by the fixing grooves of the fixing substrate and the fixing groove of the mounting substrate. In the injection method, the bonding material is the same volume as the space in the case where one bubble vent hole is formed in the fixing groove. On the other hand, in the case where two bubble vent holes are formed in the fixing groove, the bonding material was set to an amount such that injected bonding material from one hole flows over from the other hole.

The inspection was made as to whether a leak is generated in the apparatus, that is, if a gap remains in the bonding material filled in the fixing groove and the fixing groove, moisture or the like possibly comes into the apparatus through the gap. To inspect this, the apparatus having optical components was immersed in a solvent, and thereafter, was heated. And then, in this state, if the leak is generated, bubble is made from a sealed portion of the apparatus.

The inspection was made with respect to 40 samples, and then, the inspection results were shown in Table 1 together with the number of generated leaks. Further, in order to make a comparison, the inspection results of the apparatus having optical components having the conventional construction described in the prior art were shown in the Table 1.

As is evident from the Table 1 of FIG. 13, the apparatus having optical components of the present invention can effectively restrict the leak as compared with the conventional one.

The present invention is not limited to the above embodiments, and various modifications can be made within a scope which does not change the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An apparatus having optical components comprising:
   a mounting substrate;
   an optical fiber held on said mounting substrate;
   an optical element fixed on said mounting substrate and optically coupled with said optical fiber; and
   a fixing member for positioning and fixing said optical fiber to said mounting substrate,
   wherein at least any one of said mounting substrate and said fixing member has a positioning groove for positioning said optical fiber to said optical element, a fixing groove connected to said positioning groove, and a flat bottom shallower than said positioning groove; and said optical fiber is fixed by means of a bonding material applied in said fixing groove and held on said positioning groove.

2. An apparatus having optical components according to claim 1, wherein said mounting substrate is a single crystal substrate, and said positioning groove is extends along a crystal orientation of said mounting substrate.

3. An apparatus having optical components according to claim 1, wherein said positioning groove comprises at least two parts extending along said optical fiber, and said fixing groove is provided between said at least two parts of said positioning groove and connecting said at least two parts of said positioning groove.

4. An apparatus having optical components according to claim 3, wherein said positioning groove comprises at least three parts extending along said optical fiber, and said fixing groove comprises at least two parts sandwiched between said at least three parts of said positioning groove and extending along said optical fiber.

5. An apparatus having optical components according to claim 1, wherein said fixing groove comprises at least two parts extending along said optical fiber.

6. An apparatus having optical components according to claim 1, wherein said fixing groove is formed in a metallic layer by means of evaporation.

7. An apparatus having optical components according to claim 1, wherein at least one of said fixing member and said mounting substrate is provided with at least one vent hole which penetrates through said fixing groove.

8. An apparatus having optical components according to claim 7, wherein a bonding material is filled into said fixing groove through said vent hole.

9. An apparatus having optical components according to claim 1, wherein said fixing groove of said fixing member has a convex portion which partitions said fixing groove.

10. An apparatus having optical components according to claim 1, wherein said optical element is a light emitting element.

11. An apparatus having optical components according to claim 1, wherein said optical element is a light receiving element.

12. An apparatus having optical components according to claim 1, wherein said optical element is a light emitting element and a light receiving element which are optically coupled with different optical fibers.

13. An apparatus having optical components according to claim 1, wherein said optical element is a light emitting element and a light receiving element which are optically coupled with an identical optical fiber.

14. A method of manufacturing an apparatus having optical components, comprising:

a first step of forming a positioning groove for positioning an optical fiber on a substrate comprising a single crystal substrate, said positioning groove divided into at least two parts extending along said optical fiber; and a second step of forming a fixing groove between said divided positioning grooves, said fixing groove connecting said parts of said positioning grooves and filled with a bonding material for fixing an optical fiber.

15. A method according to claim 14, wherein said second step includes the steps of:

forming both end portions of a mask pattern for forming said fixing groove, said end portions surrounding an end portion of said positioning groove already formed, and etching said substrate together with said mask pattern, thereby forming said fixing groove.

16. A method of manufacturing an apparatus having optical components, comprising:

a first step of forming a fixing groove, in a substrate comprising a single crystal substrate, said fixing groove filled with a bonding material for fixing an optical fiber is encapsulated; and a second step of forming positioning grooves for positioning an optical fiber, said positioning grooves sandwiching said fixing groove and extending along said optical fiber.

17. A method according to claim 16, wherein said second step includes the steps of:

forming both end portions of a mask pattern for forming said positioning groove, said end portions having a width narrower than said fixing groove and overlapping said fixing groove; and etching said substrate together with said mask pattern, thereby forming said positioning groove.

* * * * *